United States Patent [19]

Bell et al.

[11] Patent Number: 5,084,370
[45] Date of Patent: Jan. 28, 1992

[54] RECORDING MEDIUM FOR OPTICAL DATA STORAGE

[75] Inventors: Vivien L. Bell, Brentwood; Alan G. Hulme-Lowe, Bishop's Stortford, both of Great Britain; Simone Franco, Ferrania, Italy

[73] Assignee: Minnesota Mining and Manufacturing Company, St. Paul, Minn.

[21] Appl. No.: 496,599

[22] Filed: Mar. 21, 1990

Related U.S. Application Data

[63] Continuation of Ser. No. 236,464, Aug. 25, 1988, abandoned.

[30] Foreign Application Priority Data

Aug. 28, 1987 [GB] United Kingdom ............... 8720417

[51] Int. Cl.⁵ .................................................. G03C 1/73
[52] U.S. Cl. .................................... 430/270; 430/495; 430/945
[58] Field of Search .................... 430/270, 495, 945

[56] References Cited

U.S. PATENT DOCUMENTS

| | | | |
|---|---|---|---|
| 4,307,182 | 12/1981 | Dalzell et al. | 430/339 |
| 4,499,165 | 2/1985 | Molaire | 430/17 |
| 4,547,444 | 10/1985 | Bell et al. | 430/270 |
| 4,551,413 | 11/1985 | Bell | 430/270 |
| 4,555,472 | 11/1985 | Katagiri et al. | 430/278 |
| 4,707,425 | 11/1987 | Sasagawa et al. | 430/21 |
| 4,719,170 | 1/1988 | Schrott et al. | 430/270 |
| 4,769,307 | 9/1988 | Ozawa et al. | 430/270 |
| 4,783,386 | 11/1988 | Nikles et al. | 430/19 |
| 4,814,256 | 3/1989 | Aldag et al. | 430/270 |

Primary Examiner—Marion E. McCamish
Assistant Examiner—Christopher D. Rodee
Attorney, Agent, or Firm—Gary L. Griswold; Walter N. Kirn; Mark A. Litman

[57] ABSTRACT

An optical recording element in which information can be recorded and read directly afterwards by means of laser light, the element comprising, as a recording medium, a dye, which is not capable of being isomerized due to light, dissolved or dispersed in a binder, the binder comprising a thermally cured organic material composed of non-metallic elements only, and having a cross-linked three-dimensional network structure. The thermally cured binder provides improved stability to repeated read.

16 Claims, 2 Drawing Sheets

RECORDING MEDIUM FOR OPTICAL DATA STORAGE

This is a continuation of application Ser. No. 07/236,464 filed Aug. 25, 1988, now abandoned.

FIELD OF THE INVENTION

This invention relates to an optical recording element in which information can be recorded and read by means of laser light. In particular, the invention relates to an optical recording element comprising a substrate having on at least one side a recording medium comprising dye dispersed or dissolved in a binder.

BACKGROUND TO THE INVENTION

Continuing advances in information handling technology have led to the requirement for data storage and retrieval systems capable of handling extremely large volumes of information. Optical recording, in particular optical disc recording, allows recording and accessing of information at very high data rates with a much greater recording density and archivability than is possible with magnetic recording. A highly focussed laser beam is utilized to record and recover information on the optical recording media. The selection and alignment of diode lasers into an optical recording system is discussed by Bartolini et al. in I.E.E.E. Journal of Quantum Electronics, 1981, p. 69, and both read and write apparatus are disclosed in British Patent Application No. 2 016 747A.

Many types of recording media have been disclosed for laser writing and these can be divided into two basic sorts: those which require processing after writing, and those which can be read immediately after writing. It is the latter type, possessing "direct read after write" capability and commonly known as "DRAW" media, which are of particular interest.

In order to be useful as a light absorbing layer of the recording element, materials must be able to be applied to a substrate in the form of a thin, smooth layer of high optical quality and predetermined thickness. The materials must absorb at the frequency of the optical source. Various materials have been proposed for the recording media of DRAW systems, including, for example, thin metal films, metal-impregnated polymers and organic dyes. In these cases the laser beam provides a pulse of heat energy to the recording medium which causes a change in surface morphology; i.e., formation of a bump or crater, by ablation, vaporization or melting.

One type of DRAW media comprises thin metal films and, of these, tellurium containing mixtures as disclosed in Lou et al., J. Vac. Sci. Technol., 1981, 18, 78 have been widely used. However, the preparation of recording elements incorporating tellurium is by a relatively expensive vacuum sputtering technique in which the metal does not adhere well to the substrate. It also presents environmental complications because of the toxicity of the metal.

Examples of the use of metal-impregnated polymers in recording elements include the silver-impregnated gelatin systems disclosed in United States Patent No. 4 278 758. Greater sensitivity is claimed for these systems than for the tellurium films, but high concentrations of expensive silver are used in the recording medium.

An alternative type of DRAW media uses organic compounds in place of expensive metals. As well as providing advantages of cost, the thermal properties of organic compounds are generally superior since they possess low thermal conductivity and low melting/decomposition temperatures. With the use of such systems it is important that the absorption of dye therein corresponds as closely as possible to the emission of the recording laser. Of the various lasers available, semiconductor laser diodes have the advantages, (over conventional gas lasers) of low cost, smaller size, and the possibility of easy signal modulation. The problem is, therefore, one of finding particular organic materials which have all the requisite physical properties and absorb strongly in the region compatible with laser diodes; i.e., the near infrared region of the spectrum, wavelengths between 700 and 1400 nm. Examples of dye-containing recording media for optical data storage are disclosed in Jipson and Jones, J. Vac. Sci. Technol., 1981, 18, 105; European Patent Application No. 79 200 789; Crowly et al., IBM Technical Disclosure Bull, 24, No. 11B, 1982; Law et al., Appl. Phys. Lett., 1981, 39, 718; U.S. Pat. Nos. 4 270 130, 4 364 986 and 4 446 223, PCT Patent Publication Nos. WO84/02794 and WO84/02795 and Japanese patent publication Nos. 57 203 237, 57 210 893, 57 210 894, 58 053 489, 58 056 894, 58 056 895, 58 077 043, 58 112 792, 58 219 090, 58 222 451, 58 224 447, 59 005 095, and 59 055 795.

The use of organic dyes in optical data storage systems has however, encountered some problems since the dyes tend to crystallize once applied to the substrate in thin layers, with an accompanying reduction in medium performance. This problem has been resolved, in the main part, by the coating of dye in a polymeric binder with a resultant elimination of significant detrimental crystallization.

The objective in fabricating a dye-polymer optical recording element is to provide a smooth, blemish-free coating with a high optical density at the output wavelength of the laser. Hence the binder should be able to accommodate a high loading of dye without allowing crystallization of the latter. Likewise, formation of the dye-polymer coating should not involve exposure to high temperatures or short-wavelength radiation, as these can cause dye bleaching, or distortion of the coating and/or substrate. The binder must also disintegrate to volatile fragments on absorption of the laser energy.

There is no specific teaching in the art as to the type of binder which is most suitable for use in dye-polymer optical recording media. In general, dye-polymer ablative systems are said to be superior to absorbing metal systems because of their low conductivity, low decomposition temperature and low melting point. Polymeric binders with low melting points are exemplified together with binders of low or oligomeric molecular weights, as imparting high or increased sensitivity to the media. However examples of the thermoplastics having higher glass transition temperatures, e.g. polyesters, polycarbonates, poly(N-vinyl carbazole), appear in general lists of possible binders. The most commonly-used binders are cellulose derivatives, especially nitrocellulose, thereby obeying the guidelines of low decomposition/melting point and lower binder molecular weight.

Thus much of the research into dye-in-binder systems has been concerned with the ablation properties of dye-polymer films. However, in practice, the major problem encountered in the use of dye-polymer media is not that ablation does not take place, but rather that on being repeatedly read, particularly when using a "read laser" of the same wavelength as the "write laser", the carrier to noise ratio is unacceptably degraded. To reduce the cost of the write/read device it is conventional that only a single laser is used, therefore, although the read laser power is only a fraction of the write power it is inevitable that absorption of the incident light during read will occur. This problem becomes greater as the optical density of the film is increased. Thus improvements in write-sensitivity obtained by increasing the optical density have always been accompanied by deterioration of the read-stability. The problem area in repeatedly-reading the media has been identified by mathematical modelling as the high temperatures involved in the process.

These calculations have revealed that the temperatures reached during ablation are as high as 2,000° C. and during read they may reach 400° C. (1 mW, 150 ns dwell time, 1 micron pit).

Our copending British Patent Application No. 8713563, filed June 10th 1987 discloses that dye-polymer optical recording media in which the binder is based on poly(acenaphthylene) exhibit improved repeated-reading properties compared to many known systems. We have now discovered that even greater repeated-read stability is imparted by cross-linked binders. Furthermore, this advantage is obtained with no impairment of the write-sensitivity.

Japanese Patent Publication Nos. 59 203 247, 59 201 244, 59 201 243, 59 201 241, 59 198 193 and 59 190 895 disclose optical data storage media in which the binder is formed by cross-linking a resin having a functional group in the presence of a metal-based cross-linking agent, generally with a dye having a functional group. The cross-linking agent is generally an alkoxide or chelate of a transition metal. The recording media are said to possess good shelf life and high temperature stability after recording, maintaining the initial signal/noise (S/N) ratio. These metal-cross-linked binders require high temperatures to effect the cure, risking degradation of the dye. Also the presence of heavy metal atoms is likely to inhibit the degradation of the recording medium to volatile fragments.

DE 3238285 describes photo-curable acrylic binders for optical recording media, but these require exposure to intense ultra-violet radiation, which is detrimental to many of the dyes suitable for dye-polymer recording media. Furthermore, as will be demonstrated later, the stability of dyes towards ambient light exposure can be markedly affected by the polymeric medium in which they are dispersed, and vinyl polymers have undesirable properties in this respect.

Japanese Patent Publication No. 61 184 535A discloses an optical recording medium comprising a molecule which is isomerised due to light and a highly cross-linked binder matrix e.g. thermosetting polyester, alkyd and melamine resins. The medium utilizes photochemical hole burning to obtain multiple recording.

It has now been found that binders which thermally cross-link may be used in optical recording systems comprising dye-polymer ablative recording media to provide excellent stability for repeated-read.

BRIEF SUMMARY OF THE INVENTION

According to the present invention, there is provided an optical recording element in which information can be recorded and read directly afterwards by means of laser light, the element comprising, as a recording medium, a dye, which is not capable of being isomerised by light, dispersed in a binder, the binder comprising a thermally cured organic material composed of non-metallic elements only, and having a cross-linked three dimensional network structure including structural units of at least one of the following types:

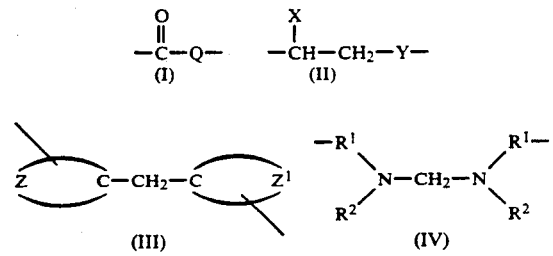

in which:

Q, is O, S or $NR^3$ in which $R^3$ is H, optionally substituted lower alkyl (of up to 4 carbon atoms) or optionally substituted aryl (of up to 8 carbon atoms), X is OH, SH or $NHR^3$ in which $R^3$ is as defined above, Y is O, S or $NR^3$ in which $R^3$ is as defined above, Z and $Z^1$ are the same or different, and represent the atoms making up an aromatic ring bearing a hydroxyl and/or amino substituent, and optionally further substituents selected from lower alkyl or alkylene groups of up to 4 carbon atoms or halogen atoms, with the proviso that at least one of the rings represented by Z and $Z^1$ contains a methylene substituent, and either (a)

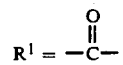

and $R^2=H$, $-CH_2-$, or optionally substituted lower alkyl, or (b) $R^1=$

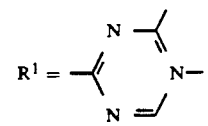

and $R^2=-CH_2-$

The use of thermally cured binders provides the recording media with surprising stability to repeated-read. Suitable selection of the resins allows thermal curing at ambient to moderate temperatures which are not detrimental to the dye, the substrate or reflective layers of the optical recording elements. Binders useful in the invention cure thermally i.e. the presence of actinic radiation is not required for the curing reaction. Generally the binders cure at temperatures less than 100° C., preferably less than 50° C. and in the most preferred embodiment, cure at ambient temperature.

DESCRIPTION OF PREFERRED EMBODIMENTS

The binders used in the invention cure thermally by the condensation of active functionalities pendant from the binder backbone, or by condensation of a binder bound functional group and an active functionality of a cross-linking agent. Preferred binders provide a network including units of formula (I) which include polyurethanes and azlactone resins. Particularly useful binders are those based upon the cross-linking of a branched polyester with a multi-isocyanate (i.e. polyisocyanate compound), exemplified by the Desmodur/Desmophen products commercially available from Bayer AG.

It has been found that any degree of cross-linking of such resins imparts improved read after write stability to the recording media but a very significant improvement is noted at a degree of cross-linking of above 30%, preferably above 40%.

Examples of binders of formula (II) include epoxy resins.

Examples of binders of formula (III) include phenol-formaldehyde resins.

Examples of binders of formula (IVa) include urea-formaldehyde resins and copolymers containing N-methylolacrylamide.

Examples of binders of formula (IVb) include malamine-formaldehyde resins.

The thermal cross-linking of the binders used in the invention imparts insolubility to the resins in noncorrosive solvents, particularly the solvent from which the resin was originally coated.

In addition to the benefits described above from the use of thermally cured, condensation polymer binders, the room light stability of the media is not impaired (compared to dye alone) by the use of these materials. This is in contrast to the situation encountered when non-cross linked acrylic or olefinic binders are employed.

The optical recording element of the invention may be in the form of a support having a recording layer coated thereon comprising one or more dyes together with the binder, or the element may be in the form of a self-supporting structure; e.g., a cast film, comprising one or more dyes and the binder. The dye must be present in the region of the surface of the recording layer in a sufficient amount to absorb an effective amount of the exposing radiation to produce a detectable mark on the surface thereof. The dye may be dissolved in the binder. It is not possible to generally quantify the minimum amount of dye required for optical recording either in terms of coating weights or optical density of the recording layer or elements since the minimum amount will vary according to the dye, the thickness of the recording layer or the construction of a self-supporting element and the particular binder present. For example, a thick layer of recording medium having a high optical density and coating weight of dye may have inferior performance to a thin layer having a lower optical density and coating weight. In general, the recording layers will have an optical density of at least 0.1, preferably at least 0.3.

The thickness of the coated recording layer is an important factor in controlling the efficiency of the laser in forming pits since good writing sensitivity requires that writing energy be effectively coupled into the recording layer. A. E. Bell and F. W. Spong, I.E.E.E. Journal of Quantum Electronics, July 1978, 487, discloses, in general, that optimum write situations are obtained when the recording layer has a thickness about one quarter the wavelength of the recording light. In recording elements of the present invention sensitivity is improved as the thickness of the recording layer is reduced below 1 micron and in preferred embodiments the thickness is in the range from 30 to 400 nm, although a general range of 10 to 1000 nm may be used.

The recording layer is generally coated onto a substrate which acts as a support. The support may be substantially any solid material, either flexible or rigid including polymeric materials; e.g., polyacrylates, polyamides, polycarbonates, polyesters, polyolefins, polysiloxanes, polyurethanes and polyvinyl resins; ceramic or glass materials; fibrous materials and metals. The support must have a melting point high enough to avoid deformation during writing of information. Also the surface of the substrate which is to be coated should be smooth and free of random surface irregularities, although it my be flat, pre-grooved or may include predetermined surface irregularities capable of being read by laser light in the final element to provide formatting, indexing or tracking functions or the like.

In one embodiment of the invention the substrate is transparent so that recording and reading can take place through the substrate.

Preferably a light reflecting layer is provided, either between the substrate and the recording layer, or, if writing and reading is to take place though the substrate, on top of the recording layer. A preferred construction comprises a semi-reflecting layer interposed between the recording layer and the transparent substrate, as described in Japanese Application No. 60/157739.

Suitable reflective materials include aluminium, copper, chromium gold and rhodium. The thickness of the light reflecting layer should be sufficient to reflect a significant amount of the recording light. Levelling and/or priming layers may also be applied to the substrate before application of the reflecting coating and/or dye containing layer. If the reflecting material itself can be formed so it is a self-sustaining layer and optically smooth, it may constitute the substrate.

A recording element in which there is both a reflecting layer and the recording layer is termed a bilayer system. This can be expanded to a trilayer system by the insertion of a spacer between the reflecting layer and the recording medium. The spacer may confer smoothness, help control the thermal performance of the medium and protect the reflecting layer. A dielectric spacer may comprise vacuum deposited $SiO_2$, or an organic polymer which does not contain any of the light-absorbing dye. The dielectric spacer is preferably transparent to the laser beam used in reading and writing on the recording layer. Examples of the construction of such recording elements are disclosed in Bartolini et al., J. Quantum Electronics, 1981, page 69.

In the recording elements of the present invention the recorded information is carried in the form of marks; e.g. about 1 micron in size, in the recording layer. Because of the high density of the information, dust or other foreign material on the top surface of the recording layer would cause significant errors. Therefore, in one embodiment of recording elements of the present invention a protective layer at least 0.6 mm thick is provided on top of the recording layer to separate dust and other particles from the recording layer. The laser beam is sharply convergent at the top surface of the recording layer and accordingly any dust particle on the protective layer would be out of focus with respect to the laser beam and thus would not affect the reading and writing process. The protective layer can be made of any material which is transparent to laser beams used in reading and writing on the recording layer and it can either be directly in contact with the recording layer or separated from it by an air, nitrogen gap or vacuum gap.

Suitable materials which can be used for the protective coating include glass, poly(methyl methacrylate), polycarbonates and polyesters.

The recording elements of the invention may be double sided, comprising a planar substrate optionally in the form of a disc, having on each major surface a reflecting layer. Above the reflective layer is coated the recording medium and optionally a protective layer.

Other suitable constructions of optical recording elements are disclosed in The Design and Optimisation of the Optical Data Disk, Alan E. Bell, Proceedings of the SID, Vol 24/1, 1983.

The particular dye to binder ratio selected as a balance between one end of the range where a high dye to binder ratio leads to the possibility of undesirable crystallization. At the other extreme too little dye may result in insufficient heat transfer from the dye to the binder to cause melting, preventing recording. In a controlled experiment without dye present, irradiation of the polymeric binder with the laser diode caused no marking of the surface. Another limitation on increasing the dye to binder ratio is the solubility of the dye in the coating solution. In practice, dye to binder weight ratios may range from 1:30 to 5:1 and preferably from 1:20 to 2.5:1.

In order to achieve the desired dye to binder ratios in a coating solution and obtain viscosities suitable for spreading, the solubility of the dye is preferably at least 10 mg/ml in the solvent chosen and more preferably at least 30 mg/ml.

The binders of the invention may be used, in principle, with any dye that absorbs strongly at the output wavelength of the laser used for reading and writing (normally in the range 800–850 nm), and which does not bleach or change its absorption characteristics under irradiation. In practice, the choice of dye will be governed by such factors as solubility in the coating solvent, reluctance to crystallise in the coating, thermal stability, resistance to fading, etc. Dyes from various classes may be suitable, e.g. cyanines, merocyanines and phthalocyanines. A particularly suitable class are the tetra-aryl polymethines described in U.S. Pat. No. 4,547,444.

The solvent used for preparing the coating composition may be selected from a wide range of known solvents such as dichlorinated solvents; e.g., dichloromethane and 1,2-dichloroethane, or ketonic solvents; e.g., cyclohexanone, or aromatic solvents; e.g., xylene. The solvents can be used alone or in combination the choice being governed to some extent by the particular dye to binder system and by the method of coating used.

Suitable methods of coating the compositions include handcoating, dipcoating, spincoating and webcoating. A very suitable process is, in particular, the centrifugal spincoating process. According to this process, the substrate to be covered is laid on a turntable and a quantity of solution is then provided on the substrate. By rotating the substrate, the liquid will spread circularly over the surface of the substrate. It has been found in experiments that very thin layers can be obtained by means of the cetrifuging process, the thickness of which depends inter alia on the rotation speed of the substrate and the viscosity of the solution to be spread. It has been found that layers having a thickness smaller than 1 micron are obtained if the viscosity of the solution lies in the order of magnitude of a few cP, for example, up to 10 cP, and a speed of rotation of approximately 500 to 2500 rpm is used. The percentage of solid substance in the solution must also be preferably low and generally be at most 5 to 10% by weight. Film thicknesses less than 0.3 micron can readily be achieved in this manner.

In an illustrative recording system embodying the principles of the present invention, a record blank comprising a disc-shaped substrate coated with a reflective layer, a recording medium of the invention and a protective layer, is subjected to rotation at a constant rotational speed while a beam of light from a light source (e.g., a laser providing light at a wavelength at which the recording medium is absorbing) is focussed on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect ablation of the absorptive material and a low level insufficient to effect such ablation, the frequency of the level alterations varying as the video signal amplitude changes.

Information tracks comprising a succession of spaced pits are formed in the coated surface of the disc, the pits appearing in those surface regions exposed to high level beam, due to vaporization or melting of the absorptive layer material in response to the high level beam exposure. Variations in the length and separation of the pits are representative of the recorded information. Where a continuous sequence of pictures is to be recorded, a spiral information track may be formed by providing relative motion, in a radial direction and at a constant rate during the recording between the recording beam and the rotating disc. Alternatively, in the absence of such relative motion during the recording, a circular information track may be formed.

The result of the above-described recording process is the formation of an information record of a form which facilitates recovery of the recorded information by optical playback process. The information track of such an information record comprises undisturbed surface regions that exhibit very low reflectance at an appropriate light frequency, alternating with pit regions, formed by the ablation process, that exhibit appreciably high reflectance at the same light frequency. A high ratio between the reflectance of the pit regions and the reflectance of the intervening (undisturbed surface) regions is readily provided. Media exhibiting lower reflectivity after writing may also be made.

In playback operations pursuant to the principles of the present invention, a light beam is focussed upon the information track of a rotating information record of the above described type. The playback beam has a constant intensity at a level insufficient to effect ablation of the disc coatings, and is of a frequency substantially corresponding to that at which the undisturbed surface regions exhibit an antireflective condition. A photodetector, positioned to receive light reflected from the successive regions of the information track as they pass through the path of the focussed light, registers a signal representative of the recorded information. A high readout contrast ratio (due to the large differences in reflectance of the pit regions and the intervening track regions, at the light frequency of the playback beam) is readily obtained, permitting recording of the recorded signals with an excellent signal-to-noise ratio.

The invention will now be illustrated by the following Examples. In these Examples, the dye used had the following structure:

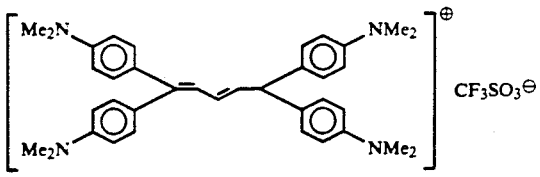

and was prepared by the method described in U.S. Pat. No. 4,547,444. The solvent in each case was a 4:1 (v/v) mixture of 1,2-dichloroethane and cyclohexanone, except when the binder was glycidyl methacrylate/methacrylic acid copolymer, in which case a 1:3 (v/v) mixture of acetone and cyclohexanone was used.

EXAMPLE I

Comparison of cross-linked binder with linear binders

Recording elements were prepared by spin-coating solutions on to grooved 5.25 inch (13.34 cm) diameter aluminium reflectorised substrates. The coating compositions were solutions containing approximately 1% solids, the solids being 1:1 (w/w) mixture of dye and binder. The binders used were poly(methyl methacrylate) (PMMA), polyacenaphthylene (PAN), and a copolymer of glycidyl methacrylate and methacrylic acid (GDM/MAA). PMMA and PAN were commercial samples (Aldrich Chemical Co.), and GDM/MAA was synthesised by the following method, and contained GDM and MAA units in the molar ratio 4:1.

The inhibitor-free, dry, vacuum distilled monomers (GDM and MAA) were dissolved in a dry, degassed mixture of acetone and ethanol (1:1 v/v). Polymerisation was initiated using 1 mole % of benzoyl peroxide at the reflux temperature. The product was recovered by precipitation in a large excess of diethyl ether, and stored in dry acetone solution.

Coating thickness after drying was approximately 0.1 micron. All coatings were air-dried at ambient temperature, and in the case of the GDM/MAA coatings, this induced crosslinking to give a three-dimensional binder matrix. A GaAs diode laser, operating at 10 mW, was used to record data on the media by ablation. The information was read back using the same laser operating at reduced power, as shown in Table 1.

TABLE 1

Comparison of cured and non-cured binder performance

| Binder | CNR 10 mW (3) | Repeated Read (2) | Laser Power at read (1) |
|---|---|---|---|
| Copolymer (GDM/MAA) | 52.4 | $7.1 \times 10^6$ | 1.2 mW |
| PMMA | 50 | Immediate degradation | 1.0 mW |
| PAN | 50 | $0.5 \times 10^6$ | 1.0 mW |

(1) Note the higher read laser power and hence read temperature for the copolymer experiments.
(2) Repeated read is measured as the number of cycles required to reduce the CNR to 45 dB.
(3) CNR 10 mW represents the carrier-to-noise ratio of the information as written.

The poor results for PMMA show that the methacrylate backbone is unstable under these conditions, yet in a cross-linked form (GDM/MAA) the methyl methacrylate polymer gives high repeated-read stability, outperforming PAN, which is a linear polymer specially chosen for its high repeated-read stability (see copending British Patent Application No. 8713563 filed on June 10th 1987). Note also that the presence of cross-linking does not impair the write-sensitivity.

EXAMPLE 2

This example demonstrates the advantages gained by cross-linking a PAN backbone via urethane groups.

Copolymers of acenaphthylene and hydroxyethyl acrylate (HEA) were prepared by conventional free-radical techniques, with the content of HEA varying over the range 5 to 20 mole %. These copolymers were combined with Desmodur L75 (a multi-isocyanate commercially available from Bayer AG) in the proportions necessary to give a stoichiometric mixture of isocyanate and pendant hydroxyl groups.

Coatings were made as described in Example 1 from solutions of 0.86% total solids with a dye-to binder ratio of 2:3 (w/w), and dried for 15 hours at ambient temperature to bring about cross-linking. The coatings were tested as described in Example 1, and the change in CNR recorded after $5.8 \times 10^5$ read cycles. The results are reported in the following Table 2.

TABLE 2

| HEA Content (mole %) | Initial CNR (dB) | Laser Read Power (mW) | Reduction in CNR (dB) |
|---|---|---|---|
| 0 (ie PAN) | 52.0 | 1.2 | 5.6 |
|  |  | 1.5 | 12.2 |
| 5 | 50.4 | 1.2 | 2.7 |
|  |  | 1.5 | 5.2 |
| 10 | 51.8 | 1.2 | 3.6 |
| 20 | 50.7 | 1.2 | 1.7 |
|  |  | 1.5 | 3.6 |

The results clearly show the benefit of cross-linking in terms of repeated-read stability without significant detriment to the write-sensitivity.

EXAMPLE 3

This example demonstrates improvements in repeated-read stability obtained by cross-linking a polymeric binder composed largely of acenaphthylene units. Two sets of copolymers were prepared by conventional free-radical techniques, set (a) containing acenaphthylene and hydroxyethyl acrylate, and set (b) acenaphthylene and methacrylic anhydride. In each set, the monomer feed ratios were controlled so as to produce copolymers containing 98, 95, 90 and 80 mole % acenaphthylene. Each copolymer in set (a) was blended with an equal weight of the corresponding copolymer of set (b) to produce a series of binders with stoichiometric mixtures of pendant hydroxyl and anhydride groups.

Coatings were made as described in Example 1, from solutions of 0.86% total solids, with a dye-to-binder ratio of 2:3 (w/w), and dried to 60° C. for 15 hours to bring about cross-linking. The coatings were tested as described in Example 1, and the change in CNR recorded after $5.8 \times 10^5$ read cycles.

The results are reported in the following Table 3.

TABLE 3

| Acenaphthylene content (mole %) | Initial CNR (dB) | Laser Read Power (mW) | Reduction in CNR (dB) |
|---|---|---|---|
| 100 | 52.0 | 1.2 | 5.6 |
|  |  | 1.5 | 12.2 |
| 98 | 48.4 | 1.2 | 0.3 |
|  |  | 1.5 | 0.4 |
| 95 | 49.4 | 1.2 | 1.6 |
|  |  | 1.5 | 1.4 |
| 90 | 48.6 | 1.2 | 0.2 |
|  |  | 1.5 | 1.2 |

TABLE 3-continued

| Acenaphthylene content (mole %) | Initial CNR (dB) | Laser Read Power (mW) | Reduction in CNR (dB) |
|---|---|---|---|
| 80 | 48.8 | 1.2 | 0.3 |

The results clearly show the benefit of cross-linking in terms of repeated read stability without significant detriment to the write-sensitivity.

EXAMPLE 4

This Example illustrates that further improvement may be obtained by the use of thermally cross-linking binders whose backbone is of increased thermal stability and with an increased degree of cross-linking.

Optical recording elements were prepared as in Example 1 using, as binders, the GDM/MAA copolymer, and Desmodur L75/Desmophen 650 (a branched polyester and multi-isocyanate commercially available from Bayer AG) in the ratio 1:1 (w/w). The binders cross-linked on drying at ambient temperature. The media were ablated and tested as in Example 1 and the results are reported in Table 4.

TABLE 4

| Binder | CNR 10 mW (dB) | Repeated Read | Laser Power at read |
|---|---|---|---|
| Desmodur/ | 47.2 | >7.15 × 10⁶ | 2.0 mW |
| Desmophen | 52.2 | >8.0 × 10⁶ | 1.5 mW |
| Copoly- | 52.4 | 7.1 × 10⁶ | 1.2 mW |
| GDM/MAA | 50.5 | 2.7 × 10⁶ | 2.0 mW |

The Desmodur/Desmophen binder clearly gives improved repeated-read stability, again with no sacrifice of write-sensitivity.

The comparisons for the binder systems used in Examples 1 and 4 are depicted in FIG. 1 of the accompanying drawings which represents a plot of CNR against repeated read for each binder.

In FIG. 1:

Plots A and B refer to Desmodur/Desmophen bound disks read at 1.5 mW and 2 mW respectively.

Plot C refers to a GDM/MAA copolymer bound disk read at 1.2 mW.

Plot D refers to a poly(acenaphthylene) bound disk read at 1.0 mW.

Plot E refers to a poly(methylmethacrylate) bound disk read at 1.0 mW.

The solid lines indicate experimental results and the dashed lines are extrapolations.

EXAMPLE 5

Effect of Degree of Cross-linking

The example demonstrates the effect of cross-link density on repeated-read stability for a given binder system.

Recording elements were prepared as in Examples 1 and 2 using Desmodur L75/Desmophen 650 as the binder and varying the relative proportions of two components so as to vary the cross-link density in the cured resin. Table 5 lists the degrees of cross-linking obtained, assuming a stoichiometric reaction between the isocyanate groups and the polyester. The samples were ablated as in Example 1 and subjected to repeated read at a laser power of 1.2 mW. The change in CNR after 100,000 reads was determined. FIG. 2 of the accompanying drawings represents a plot of change in CN against percentage cross-linking.

The degree of cross-linking referred to is the number of cross-linking functionalities added, expressed as a percentage of the reactive groups available from the backbone polymer. The results demonstrate that any degree of cross-linking is beneficial to the repeated read stability of the optical recording media, but especially those exceeding 30%, and more especially when the degree of cross-linking exceeds 40%.

TABLE 5

| Parts Desmodur L75 per hundred parts Desmophen 650 | Percent cross-linking |
|---|---|
| 143 | 93 |
| 97 | 63 |
| 85 | 55 |
| 69 | 45 |
| 58 | 38 |
| 45 | 30 |
| 31 | 20 |
| 11 | 7 |
| 7.7 | 5 |

EXAMPLE 6

Comparison of Room Light Stability

This Example demonstrates an additional, unexpected, advantage of the preferred binder system in terms of stability towards photo-bleaching of the dye.

Dissolved dye-in-binder films were prepared by spin-coating solutions onto polyester film to achieve a thin uniform coating. The solutions were approximately 1% solids where the solid portion consisted of dye in 0.4:0.6 ratio with the appropriate binder, except for sample 1, which, as a control, consisted of dye and solvent only. More accurately, the percent solids used gave an initial optical density at 830 nm of 0.3 when referenced against air. The Desmodur L75/Desmophen 650 system (1:1 w/w) was thermally cured at ambient temperature to produce a cross-linked binder matrix. Each sample was subjected to an accelerated simulation of daylight exposure by 24 hours' irradiation with a xenon arc light source (unfiltered). The binder used and the stability data, expressed as percentage loss of optical density, are reported in Table 6.

TABLE 6

| Sample | Binder | % absorption loss in NIR max |
|---|---|---|
| 1 | None | 24 |
| 2 | Desmodur L75 Desmophen 650 | 25 |
| 3 | Poly(acenaphthylene) | 61 |
| 4 | PMMA | 32 |

Under these conditions, the unadulterated dye loses 24% of its absorbance, but the density loss increases markedly when the dye is dissolved in PAN or PMMA. In contrast, there is no significant increase in photo-bleaching with the Desmodur/Desmophen system.

We claim:

1. An optical recording element in which information can be recorded and read directly afterwards by means of the same wavelength laser light, the element comprising, as a recording medium, a dye, which is not capable of being isomerised due to light, dissolved or dispersed in a binder, the binder comprising a thermally cured organic material composed of non-metallic elements only, and having a cross-linked three-dimensional network structure having a degree of crosslinking exceeding 30%, said binder including structural units of at least one of the following types:

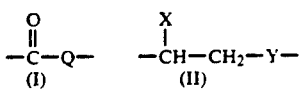
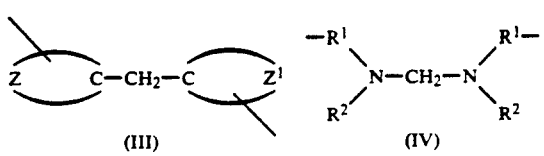

in which:
Q, is O, S or $NR^3$ in which $R^3$ is H, optionally substituted lower alkyl of up to 4 carbon atoms or optionally substituted aryl up to 8 carbon atoms,
X is OH, SH or $NHR^3$ in which $R^3$ is as defined above,
Y is O, S or $NR^3$ in which $R^3$ is as defined above,
Z and $Z^1$ are the same or different, and represent the atoms making up an aromatic ring bearing a hydroxyl and/or amino substituent, and optionally further substituents selected from lower alkyl or alkylene groups or halogen atoms, with the proviso that at least one of the rings represented by Z and $Z^1$ contains a methylene substituent, and either
a)

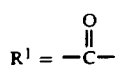

and $R^2$=H, —$CH_2$—, or optionally substituted lower alkyl, or
b)

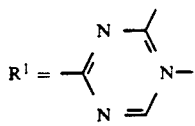

and $R^2$=—$CH_2$—.

2. An optical recording element as claimed in claim 1 characterised in that the binder is a condensation polymerisation product and cross-linking is effected by a condensation reaction.

3. An optical recording element as claimed in claim 1 characterised in that the binder is a copolymer of glycidyl methacrylate and (meth)acrylic acid having units of formula (I) or formula (II).

4. An optical recording element as claimed in claim 1 characterised in that the binder is a branched polyester providing structural units of formula (I).

5. An optical recording element as claimed in claim 1 characterised in that the binder has units of formula (I), formula (II), formula (III) or formula (IV) and is selected from azlactone, epoxy, phenol-formaldehyde, urea-formaldehyde, methylolacrylamide and melamine-formaldehyde resins and the dye is selected from cyanine, merocyanine, phthalocyanine and tetra-arylpolymethine dyes.

6. An optical recording element as claimed in claim 1 comprising a support having a layer of recording medium coated thereon, the thickness of the recording layer being less than 1 micrometer and the weight ratio of dye to binder of the recording layer being in the range from 1:30 to 5:1.

7. A recording element as claimed in claim 6 characterised in that the surface of the substrate to which the recording layer is applied is light reflective.

8. An optical recording element as claimed in claim 6 characterised in that a dielectric layer is interposed between the recording layer and substrate.

9. A recording element as claimed in claim 6 characterised in that the support is transparent to visible and near infra-red radiation and that a semi-reflective layer is interposed between the substrate and the recording layer.

10. An optical recording element as claimed in claim 6 characterised in that the substrate is free from random surface irregularities having on each major surface a reflecting layer above which is coated a recording layer.

11. An optical recording element as claimed in claim 6 characterised in that the top surface of the recording medium is protected by an overcoat layer of material transparent to near infra-red radiation either directly in contact with it or separated from it by a clean sealed, air, nitrogen or vacuum gap.

12. An optical recording element in which information can be recorded and read directly afterwards by means of laser light, the element comprising, as a recording medium, a dye, which is not capable of being isomerised due to light, dissolved or dispersed in a binder, the binder comprising a thermally cured organic material composed of non-metallic elements only, and having a cross-linked three-dimensional network structure including structural units having the formula:

in which:
Q, is O, S or $NR^3$ in which $R^3$ is H, lower alkyl of up to 4 carbon atoms or substituted aryl up to 8 carbon atoms, said binder is a branched polyester providing structural units of formula (I), and said binder is cured by cross-linking with polyisocyanate.

13. An optical recording element as claimed in claim 12 characterised in that the binder has a degree of cross-linking of at least 40%.

14. An optical recording element in which information can be recorded and read directly afterwards by means of laser light, the element comprising, as a recording medium, a dye, which is not capable of being isomerised due to light, dissolved or dispersed in a binder, the binder comprising a thermally cured organic material composed of non-metallic elements only, and having a cross-linked three-dimensional network structure including structural units having the formula:

in which:
Q, is O, S or $NR^3$ in which $R^3$ is H, lower alkyl of up to 4 carbon atoms or substituted aryl up to 8 carbon atoms, said binder is a branched polyester providing structural units of formula (I).

15. An optical recording element in which information can be recorded and read directly afterwards by means of laser light, the element comprising, as a recording medium, a dye, which is not capable of being isomerised due to light, dissolved or dispersed in a binder, the binder comprising a thermally cured organic material composed of non-metallic elements only, and having a cross-linked three-dimensional network structure including a condensation polymerization product in which crosslinking is affected by a condensation reaction, said binder having structural units of the formula:

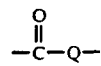

in which:
Q, is O, S or $NR^3$ in which $R^3$ is H or optionally substituted lower alkyl of up to 4 carbon atoms.

16. An optical recording element as claimed in claim 15 characterised in that the binder is a copolymer of glycidyl methacrylate and (meth)acrylic acid having units of the formula:

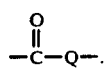

* * * * *

UNITED STATES PATENT AND TRADEMARK OFFICE
CERTIFICATE OF CORRECTION

PATENT NO. : 5,084,370
DATED : Jan. 28, 1992
INVENTOR(S) : Bell, et al

It is certified that error appears in the above-identified patent and that said Letters Patent is hereby corrected as shown below:

Col. 4, line 40, "(b)$R^1$=" should read --(b)--

Col. 4, line 60, Before "Description of Preferred Embodiments" insert

Signed and Sealed this

First Day of June, 1993

Figure 1:
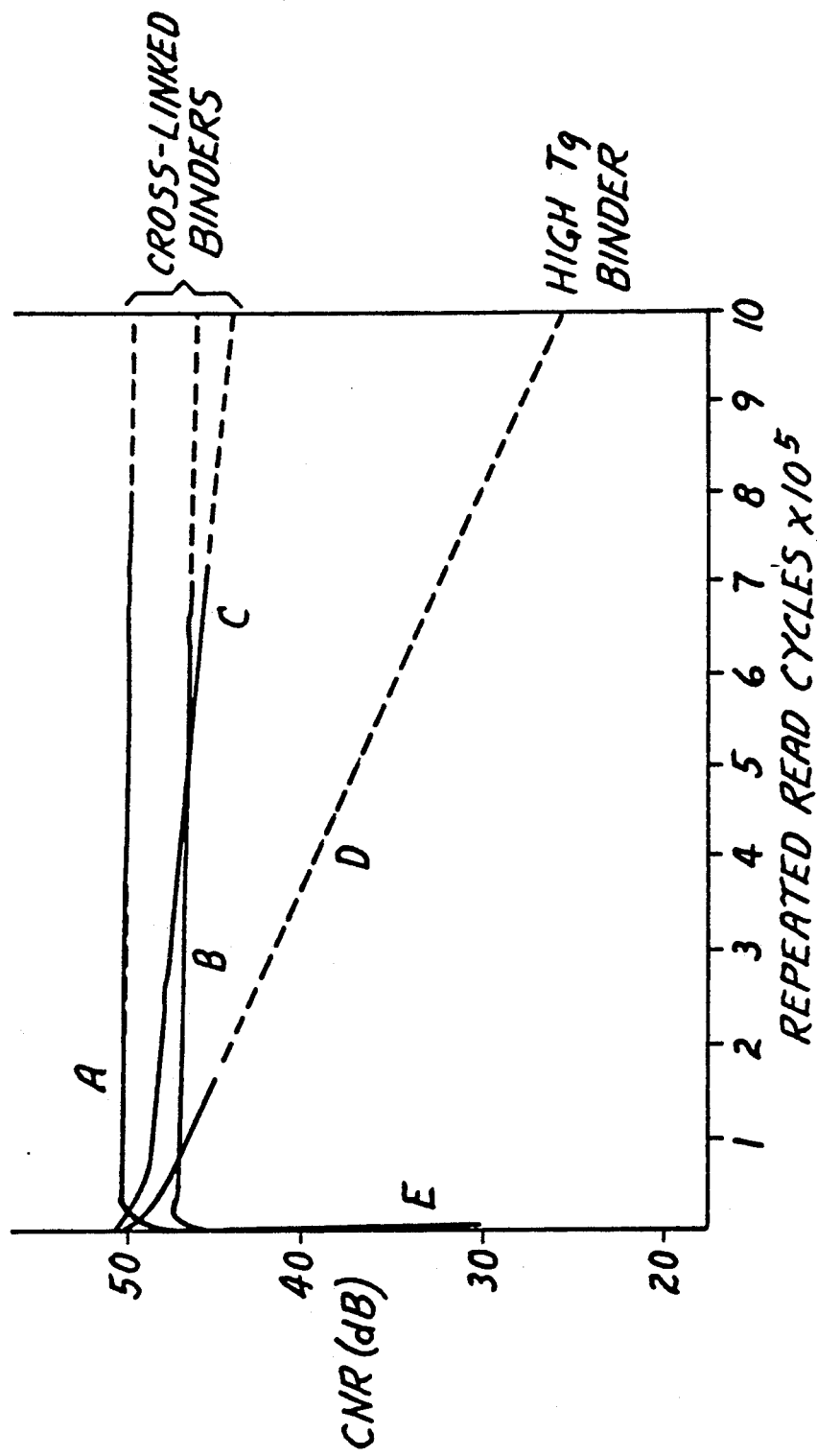
Figure 1 is a graph showing the carrier-to-noise ratio versus repeated read cycles.
Figure 2:
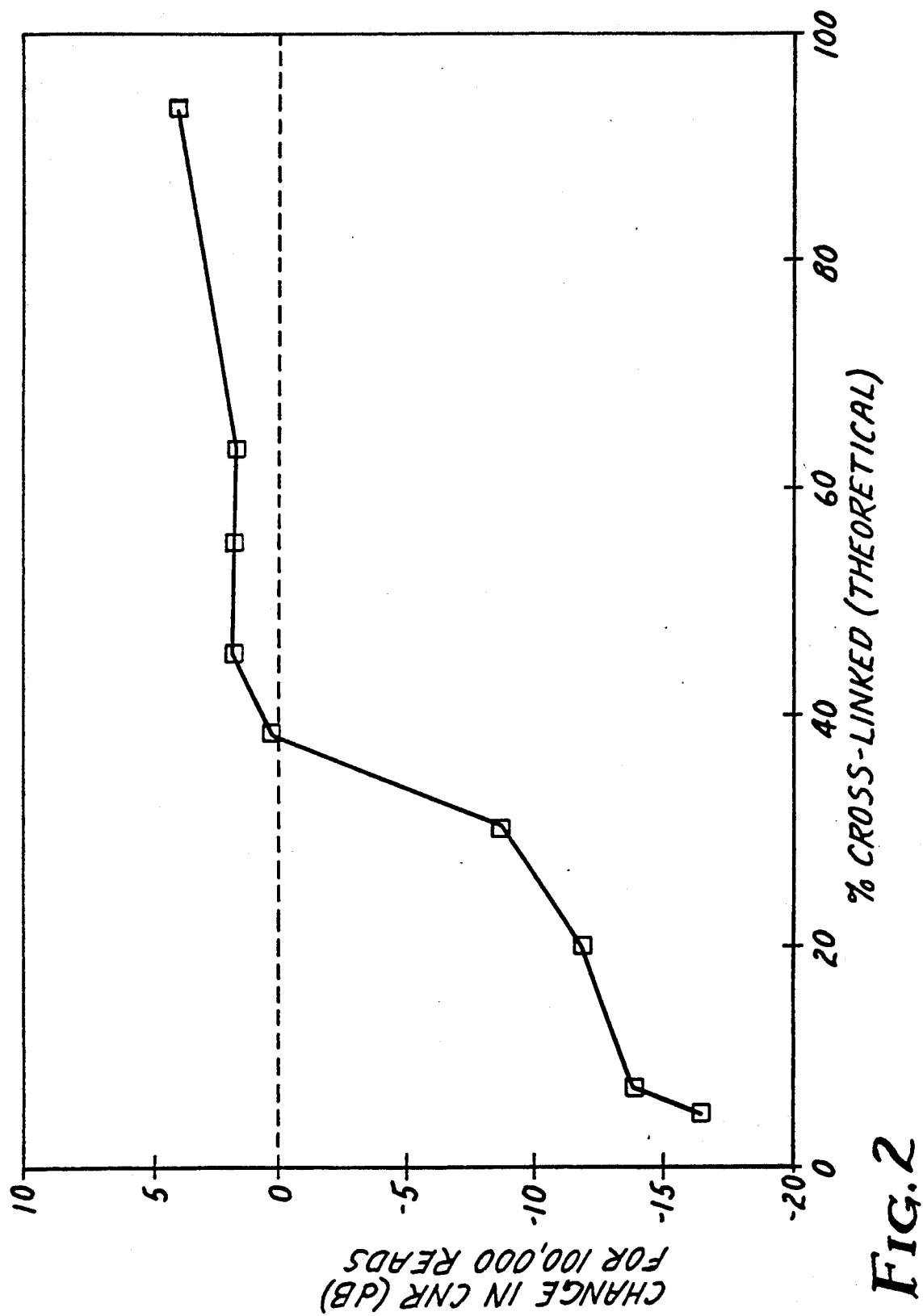
Figure 2 is a graph showing the change in carrier-to-noise ratio versus the theoretical percent of crosslinking in a binder.--

Attest:

MICHAEL K. KIRK

Attesting Officer     Acting Commissioner of Patents and Trademarks